(12) United States Patent
Mehas et al.

(10) Patent No.: US 7,791,324 B2
(45) Date of Patent: Sep. 7, 2010

(54) SWITCHING REGULATOR WITHOUT A DEDICATED INPUT CURRENT SENSE ELEMENT

(75) Inventors: Gustavo James Mehas, Sunnyvale, CA (US); Naveen Jain, Panipat (IN); Jayant Vivrekar, San Jose, CA (US); Michael Jason Houston, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 12/080,263

(22) Filed: Mar. 31, 2008

(65) Prior Publication Data

US 2008/0278123 A1 Nov. 13, 2008

Related U.S. Application Data

(60) Provisional application No. 60/909,169, filed on Mar. 30, 2007.

(51) Int. Cl.
 *G05F 1/00* (2006.01)
(52) U.S. Cl. ...................... 323/283; 323/224
(58) Field of Classification Search ................ 323/224, 323/283
See application file for complete search history.

(56) References Cited

U.S. PATENT DOCUMENTS

| | | | | |
|---|---|---|---|---|
| 6,194,883 B1* | 2/2001 | Shimamori | ................ | 323/283 |
| 7,148,669 B2* | 12/2006 | Maksimovic et al. | ....... | 323/283 |
| 7,463,011 B2* | 12/2008 | Sharma | ...................... | 323/283 |
| 7,492,134 B2* | 2/2009 | Tang et al. | .................. | 323/241 |
| 7,570,036 B2* | 8/2009 | Tang et al. | .................. | 323/283 |
| 2004/0018927 A1* | 1/2004 | Baik et al. | .................... | 494/10 |
| 2005/0275392 A1* | 12/2005 | Wong et al. | ................. | 323/283 |

* cited by examiner

*Primary Examiner*—Shawn Riley
(74) *Attorney, Agent, or Firm*—Paul A. Bernkopf; Graybeal Jackson LLP (57) ABSTRACT

A synchronous regulator includes a controller coupled to receive a reference signal and a feedback signal from the regulator operable to provide a pulse width modulation (PWM) signal at its output. The regulator includes at least one gate driver coupled to receive the PWM signal, and a synchronous output switch having a phase node there between controlled by the gate driver, and regulator input current measurement circuitry. The regulator input current measurement circuitry comprises a circuit operable for providing a signal representative of at least one phase node timing parameter, a sensing circuit operable for sensing inductor or output current provided by the regulator, and a calculation circuit coupled to receive the signal representative of the phase node timing parameters and the inductor or output current and is operable to determine the input current.

25 Claims, 7 Drawing Sheets

$$D_M = \frac{-(V_{OUT} + I_{OUT} \cdot DCR + I_{OUT} \cdot R_{SY})}{-V_{IN} - I_{OUT} \cdot R_{SY} + I_{OUT} \cdot R_{SW}}$$

Actual Duty Cycle $$D_I = \frac{V_{OUT}}{V_{IN}}$$

Ideal Duty Cycle

FIG. 10

$$\eta_D = \frac{D_I}{D_M} \qquad \eta_A = Actual\_Efficiency$$

$$\eta_C = \frac{P_{OUT}}{\frac{P_{OUT}}{\eta_D} + P_{DR}} = \eta_D \cdot \left(\frac{1}{1 + \frac{P_{DR} \cdot \eta_D}{P_{OUT}}}\right) \rightarrow \eta_D \cdot \left(\frac{1}{1 + \frac{X \cdot \eta_D}{I_{OUT}}}\right)$$

SWITCHING REGULATOR WITHOUT A DEDICATED INPUT CURRENT SENSE ELEMENT

PRIORITY CLAIM

This application claims the benefit of U.S. Provisional Patent Application No. 60/909,169, entitled, METHOD FOR DETERMINATION OF INPUT CURRENT INTO A SWITCHING REGULATOR EXCLUSIVE OF A DEDICATED SENSE ELEMENT, filed on Mar. 30, 2007, which application is incorporated herein by reference in its entirety.

TECHNICAL FIELD

Embodiments of the present invention relate generally to voltage regulator circuits and more specifically to a switching voltage regulator that determines an input current supplied to the regulator.

BACKGROUND

In switching regulators, it is often desirable to measure the input current coming into or being supplied to the regulator during operation. This is particularly true when batteries are being used as the power source and the amount of discharge current out of the batteries needs to be monitored and/or limited to, for example, improve the life of the batteries. Moreover, customers often have the need to determine the power efficiency of their switching regulators and to do so requires the ability to monitor the input voltage Vin, input current Iin, output voltage Vout, and output current Iout of the regulator. The power efficiency of a switching regulator is given by the output power Pout provided by the regulator divided by the input power Pin supplied to the regulator (Pout/Pin), where Pout=Iout×Vout and Pin=Iin×Vin. While customers would like to be able to determine power efficiency, they do not want to significantly increase the cost or complexity of their regulators to do so. Input voltage Vin, output voltage Vout and output current Iout are all presently monitored in most switching regulators. Input current Iin, however, is not typically monitored and needs to be in order to enable the power efficiency to be determined. As will be appreciated by those skilled in the art, the input current Iin to a switching regulator is a pulsed current and is not a direct current (DC) signal that is easily measured.

Figure 1:
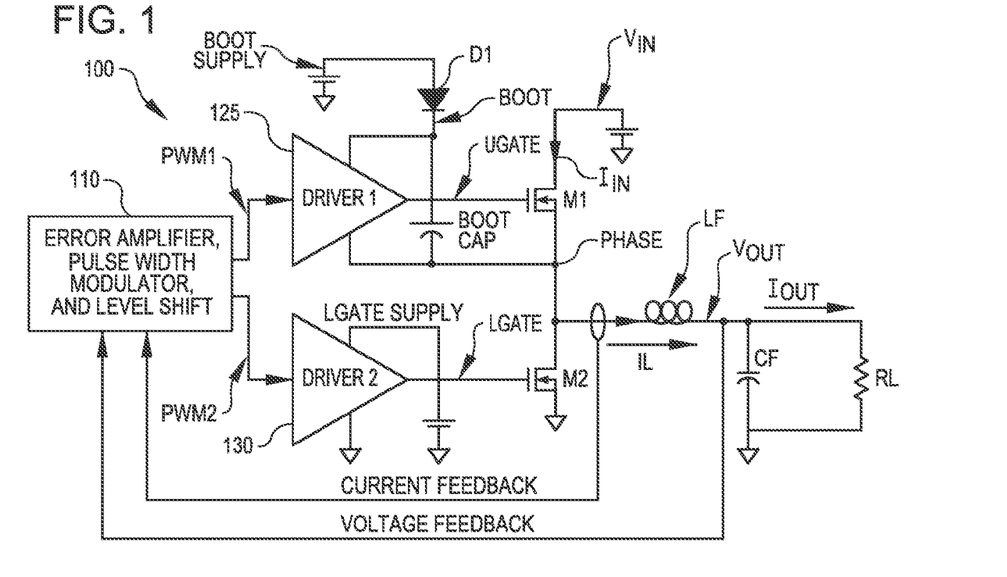
FIG. 1 is a simplified schematic and functional block diagram of a conventional switching regulator having a Buck converter topology.

The output current Iout from a switching regulator can be sensed using a sensing element, such as the low side of a metal oxide semiconductor field effect transistor (MOSFET) switch in the regulator, or using a DC resistance (DCR) of an output inductor or a current sense resistor in series with an output switch, as will be appreciated by those skilled in the art. FIG. 1 is a schematic and functional block diagram of a typical switching regulator 100 having a Buck converter topology and emphasizing the output section of the regulator. A control section 110 of the regulator is not shown in detail, but typically includes an error amplifier with feedback components, a pulse width modulator circuit, and level shifters to translate pulse width modulated signals PWM1, PWM2 generated in the control section to levels suitable for the control of two driver circuits 125 and 130, as will be appreciated by those skilled in the art. In response to the PWM1 and PWM2 signals, the driver circuits 125 and 130 develop an upper gate signals UGATE and lower gate signals LGATE, respectively, that are applied to control the switching of an upper gate NMOS transistor M1 and lower gate NMOS transistor M2. The UGATE and LGATE signals are complementary signals to operate the transistors M1 and M2 operate in a complementary manner, meaning when the UGATE signal is active to turn ON transistor M1 the LGATE signal if inactive to turn OFF transistor M2, and vice versa. The transistors M1 and M2 are connected to one end of an inductor LF at a phase node PH, with the other end of the inductor developing an output voltage Vout across a load that is represented by a capacitor CF and resistor RL. The control section 110 receives a current feedback signal indicating the value of an output current Iout flowing through the inductor LF and a voltage feedback signal indicating the value of an output voltage Vout developed by the switching regulator 100.

In operation, the control section 110 develops the pulse width modulated signals PWM1, PWM2 responsive to the current and voltage feedback signals to control the switching ON and OFF of the driver circuits 125 and 130. In response to the PWM1 and PWM2 signals, the driver circuits 125 and 130 alternatively activate the transistors M1 and M2 to provide either a boot voltage on the phase node PH when the transistor M1 is activated (and transistor M2 is deactivated) or to provide a reference voltage (ground in the example of FIG. 1) on the phase node when the transistors M2 is activated (and transistor M1 is deactivated). Power is supplied to the load and stored in the inductor LF when the transistors M1 and M2 are ON and OFF, respectively, and is transferred from the inductor to the load when the transistors M1 and M2 are OFF and ON, respectively, as will be understood by those skilled in the art. The PWM1, PWM2 signals have an associated duty cycle that determines how long each transistor M1, M2 is turned ON and OFF during a corresponding cycle and in this way determine the value of the generated output voltage Vout. The control section 110 controls the duty cycle of the PWM1, PWM2 signals responsive to the voltage feedback signal so that the desired output voltage Vout is generated.

A current sensing element senses the output current of the switching regulator 100 that flows through the load and generates the current feedback signal indicating the value of this current. The control section 110 also sense the output voltage Vout across the load as previously discussed. The input voltage Vin is also known in the conventional switching regulator 100. Moreover, the input current Iin, which corresponds to the current flowing into the transistor M1, can also be and is sensed in some conventional switching regulators. From these sensed parameters, namely input current Iin, input voltage Vin, output current Iout, and output voltage Vout, the control section 110 can calculate the efficiency of the switching regulator 100.

Sensing of the input current Iin, however, requires additional circuitry such as a dedicated sense element like a sense amplifier, sense resistor, or current sense transformer and additional circuitry in the control section 110. The input current Iin is a pulsed current signal and an average value must be determined for use in calculating power efficiency, with this average value being based upon the magnitude and duty cycle of the input current. This additional circuitry increases the cost of the switching regulator 100, occupies valuable space in an integrated circuit in which the switching regulator or portions thereof are typically formed, and increases the cost of the regulator.

SUMMARY

According to one embodiment of the present invention, a synchronous regulator includes a controller coupled to receive a reference signal and a feedback signal from the regulator operable to provide a pulse width modulation signal at its output. The regulator includes at least one gate driver coupled to receive the PWM signal, and a synchronous output switch having a phase node there between controlled by the gate driver, and regulator input current measurement circuitry. The regulator input current measurement circuitry comprises a circuit operable for providing a signal representative of at least one phase node timing parameter, a sensing circuit operable for sensing inductor or output current provided by the regulator, and a calculation circuit coupled to receive the signal representative of the phase node timing parameters and the inductor or output current and is operable to determine the input current.

DETAILED DESCRIPTION

In one embodiment of the present invention, input current measurement circuitry (not shown in FIG. 1) is contained in the control section 110 of the switching regulator 100 of FIG. 1 and is coupled to the phase node PH to receive voltage signals developed on the phase node. The input current measurement circuitry is also coupled to the inductor LF to sense the sense the inductor current IL provided by the switching regulator 100. In operation, the input current measurement circuitry is operable to determine timing parameters of the voltage signals developed on the phase node PH and is operable using these timing parameters and the sensed inductor current IL to determine the input current Iin of the switching regulator 100. In this way, the input current measurement circuitry determines the input current Iin without requiring extra pins on an integrated circuit containing some or all of the circuitry of the switching regulator 100 and without requiring dedicated sensing elements external to the integrated circuit for directly sensing the input current Iin.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

Although described as being contained in the control section 110 in the switching regulator 100, the input current measurement circuitry is formed in different ways in different embodiments of the present invention. For example the input current measurement circuitry can be a separate, standalone circuit from an integrated circuit containing the other circuitry of the switching regulator 100 or portions thereof. Moreover, the switching regulator 100 has different circuit topologies in other embodiments of the present invention and is not limited to the Buck converter topology in the example of FIG. 1. In other embodiments, the switching regulator 100 has a boost, single ended primary inductor converter (SEPIC), CUK, flyback, Buck-boost, or other suitable converter topology, as will be appreciated by those skilled in the art.

Figure 2:
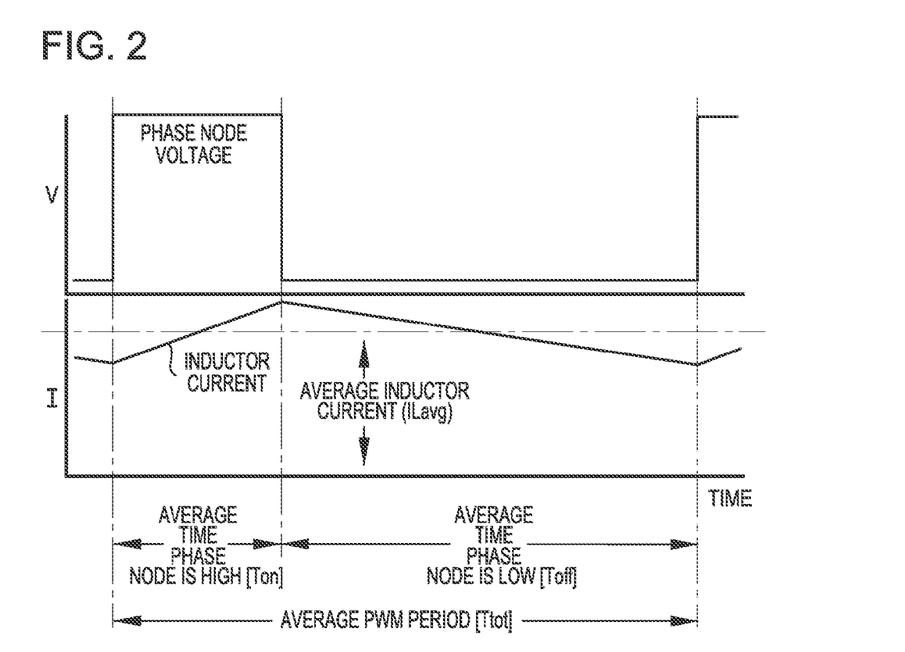
FIG. 2 is a signal diagram illustrating voltage and currents on various nodes as a function of time that are developed during operation of the switching regulator of FIG. 1 and that are used by input current measurement circuitry to calculate input current of the switching regulator without directly sensing the input current according to an embodiment of the present invention.

A more detailed description of the operation of the input current measurement circuitry according to one embodiment of the present invention will now be provided with reference to FIG. 2. FIG. 2 is a signal diagram illustrating voltages and currents as a function of time that are developed on various nodes of the switching regulator 100 of FIG. 1 during operation of the switching regulator. The upper signal diagram shows the voltage on the phase node PH as a function of time while the lower diagram illustrates the inductor current IL through inductor LF as a function of time. As shown in the signal diagrams, a phase node positive pulse width time Ton is illustrated and corresponds to the time that the upper gate NMOS transistor M1 is activated to couple the input voltage Vin to the phase node PH to thereby provide a positive voltage pulse on the phase node. A phase node off pulse width time Toff is illustrated and corresponds to the time that the lower gate NMOS transistor M2 is activated to couple the phase node PH to approximately ground through the lower gate NMOS transistor. A phase node period Ttot is equal to the sum of the phase node positive pulse width time Ton and the phase node off pulse width time Toff (Ttot=Ton+Toff).

The lower signal diagram illustrates the inductor current IL the inductor LF during the phase node period Ttot. As illustrated, during the phase node positive pulse width time Ton the current IL through the inductor LF increases linearly from a minimum value to a maximum value. Because the inductor current IL varies linearly, an average inductor current ILavg occurs at the midpoint of the phase node positive pulse width time Ton. Similarly, during the phase node off pulse width time Toff the current IL through the inductor LF decreases linearly from the maximum value to the minimum value. Once again, because the inductor current IL varies linearly during this time, the average inductor current ILavg occurs at the midpoint of the phase node off pulse width time Toff as shown.

From the two signal diagrams of FIG. 2, it is seen that if the value of the inductor current IL is determined at the midpoint of either the phase node positive pulse width time Ton or the phase node off pulse width time Toff then this value for the inductor current corresponds to the average inductor current ILavg. As will now be described in more detail, the charge balance characteristics of the switching regulator 100 enable the average inductor current ILavg along with the phase node positive pulse width time Ton and phase node period Ttot to be utilized in determining the average input current Iin.

According to the charge balance characteristics of the switching regulator 100, in the steady state charge does not accumulate in the inductor LF so that charge into the inductor LF must equal charge out of the inductor. Accordingly, an average charge Qin drawn from the source of the input voltage Vin must equal the average charge provided through the inductor LF, where the average charge provided through the inductor is given by (Ton×ILavg). So the average charge Qin=(Ton×ILavg). Furthermore, the average input current Iin is given by the average charge Qin drawn from the source of the input voltage Vin during period of the pulse width modulated signals PWM1, PWM2 that control the activation of the upper and lower gate NMOS transistors M1, M2. The period of these PWM signals corresponds to the phase node period Ttot, meaning that the average input current Iin is equal to the average charge Qin divided by the phase node period Ttot (Iin=Qin/Ttot). Because Qin=(Ton×ILavg), the average input current is given by the following equation:

$$Iin=(Ton \times ILavg)/Ttot \qquad (1)$$

where Ton is the positive pulse width time of the signal on the phase node PH, Ttot is the period of the signal on the phase node PH, and ILavg is the current through the inductor LF.

Figure 3A:
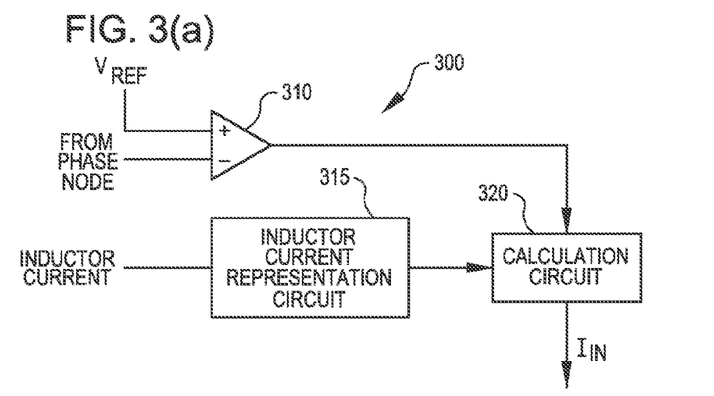
FIG. 3(a) is block diagram of an input current measurement circuit for measuring the input current of the switching regulator of FIG. 1 according to one embodiment of the present invention.

From equation 1 above it is seen that if the parameters Ton, Ttot, and ILavg are determined then the average input current Iin can be calculated. These parameters can be sensed or determined in a variety of different ways. In one embodiment, a voltage detection device such as a comparator determines when the voltage on the phase node PH passes through a defined voltage threshold and generates a corresponding output signal. FIG. 3(a) is block diagram of an input current measurement circuit 300 including such a comparator 310 according to one embodiment of the present invention. The comparator 310 receives a reference voltage VREF on a noninverting input and receives the voltage on the phase node PH on the inverting input. In operation, the comparator 310 generates an output signal that indicates how long the voltage on the phase node is above the reference voltage VREF and how long the voltage on the phase node is less than the reference voltage. The comparator 310 drives its output high for a time corresponding to the time Toff that the voltage on the phase node PH is less than the reference voltage VREF and drives its output low for a time corresponding to the time Ton that the voltage on the phase node PH is greater than the reference voltage.

In the embodiment of the input current measurement circuit 300, a calculation circuit 320 receives the output from the comparator 310 and utilizes this output to calculate the phase node positive pulse width time Ton and the phase node period Ttot. The calculation circuit 320 may calculate these values in a variety of different ways, as will be appreciated by those skilled in the art. For example, a counter could be utilized in determining the time between a first failing edge of the output signal of the comparator 310 and the subsequent rising edge of the output signal to thereby calculate the phase node positive pulse width time Ton. Similarly, a counter could be utilized in determining the time between consecutive failing edges of the output signal from comparator 310 to thereby calculate the phase node period Ttot.

The calculation circuit 320 also utilizes the calculated positive pulse width time Ton to determine when to sample the inductor current IL through the inductor LF to obtain a value for the average inductor current ILavg. As previously described with reference to FIG. 2, the inductor current IL has the average value ILavg at the midpoint of the positive pulse width time Ton. Accordingly, the calculation circuit 320 should sample the inductor current IL at this point to thereby obtain the value of the average inductor current ILavg through the inductor LF. An inductor current representation circuit 315 senses the conductor current IL flowing through the inductor LF and generates a corresponding output signal. The calculation circuit 320 samples the output signal from the inductor current representation circuit 315 at the determined midpoint of the positive pulse width time Ton to thereby obtain the value of the average inductor current ILavg.

From these three parameters, namely the phase node positive pulse width time Ton, phase node period Ttot, and average inductor current ILavg the calculation circuit 320 utilizes equation 1 (Iin=(Ton×ILavg)/Ttot)) to calculate the average input current Iin to the switching regulator 100. The control section 110 of FIG. 1 thereafter utilizes the calculated average input current Iin in calculating the efficiency (Pout/Pin) of the switching regulator 100, as previously described above. The control section 110 typically generates an efficiency signal indicating the calculated efficiency and this efficiency signal is utilized by other components in a system containing the switching regular 100 to control the operation of the switching regulator.

In other embodiments of the present invention, other techniques are utilized in place of the comparator 310 to measure the parameters Ton and Toff. For example, in another embodiment the voltage across the inductor LF is sensed to determine the parameters Ton and Ttot since this voltage will vary during operation of the switching regulator 100 in a way that enables detection of these parameters, as will be appreciated by those skilled in the art. For example, the voltage across the inductor LF changes polarity when the lower gate NMOS transistor M2 is activated and thus this change in polarity can be utilized to contact the end of the phase node positive pulse width time Ton or the start of the phase node off pulse width time Toff.

A variety of other techniques can be utilized to measure the parameters Ton and Toff, as will be appreciated by those skilled in the art. For example, the pulse width modulated upper gate signal UGATE and the lower gate signal LGATE applied to upper gate NMOS transistor M1 and lower gate NMOS transistor M2, respectively, could also be utilized in determining the parameters Ton and Ttot. This is true because the UGATE and LGATE signals control the switching of the NMOS transistors M1 and M2 which, in turn, control the voltage signal developed on the phase node PH. Other signals developed in the switching regulator 100 and in other switching regulator topologies to which embodiments of the present invention may be applied can also be utilized in determining the parameters Ton and Ttot. For example, in the switching regulator 100 the pulse width modulated signals PWM1, PWM2 are applied to the driver circuits 125 and 130 to control the generation of the UGATE and LGATE signals. As a result, the PWM1, PWM2 signals could be sensed and utilized by the calculation circuit 320 in determining the parameters Ton and Tot. These less direct techniques for determining the parameters Ton and Ttot can, of course, introduce errors into the accurate determination of the value of these parameters. For example, switching delays in the driver circuits 125 and 130 and NMOS transistors M1 and M2 could result in the phase node positive pulse width time Ton and phase node period Ttot having smaller values then maybe indicated by the PWM1, PWM2 signals. These errors, however, can typically be compensated for when such less direct techniques are utilized, as will be appreciated by those skilled in the art.

In some embodiments noise and/transients can create systematic errors in the measurements of the Ton, Ttot, and ILavg parameters, and digital filters such as infinite impulse response (IIR) filters can be utilized to reduce the adverse affects of such noise and/or transients. Also, in other embodiments the output current Iout may be used in equation 1 in place of average inductor current ILavg, where by convention the output current Iout includes current provided by the output capacitor CF. Once again, due to charge balancing, in the steady state the charge into the capacitor CF must equal the charge out of the capacitor and so ILavg will be equal to the average output current Iout.

Figure 3B:
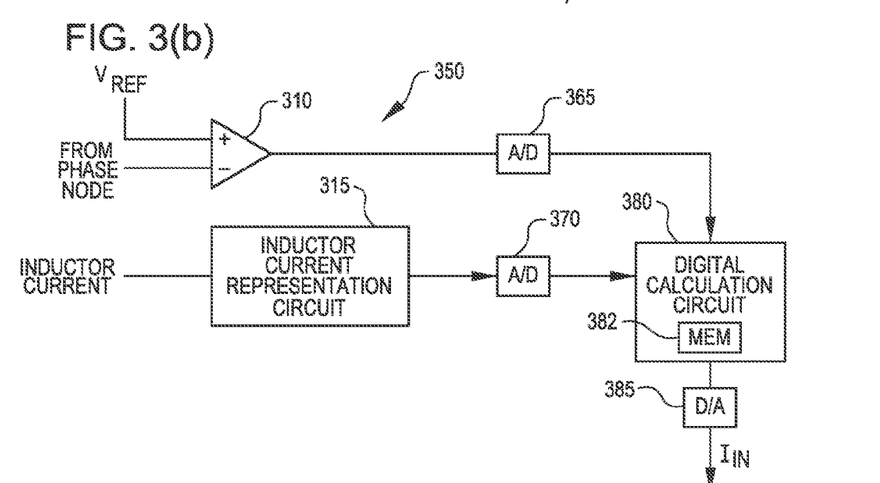
FIG. 3(b) is a block diagram of an input current measurement circuit for measuring input current of the switching regulator of FIG. 1 according to another embodiment of the present invention.

Another embodiment of an input current measurement circuit 350 is shown in FIG. 3(b). In this embodiment, digital sampling and averaging is used to measure the average value of the phase node positive pulse width time Ton and average phase node period Ttot. The measurement circuit 350 includes the comparator 310 and inductor current representation circuit 315 previously described with reference to FIG. 3(a). The output from the comparator 310 is supplied to an analog-to-digital converter 365 that digitizes the output signal from the comparator and generates a corresponding digital value that is supplied to a digital calculation circuit 380. Similarly, an analog-to-digital converter 370 digitizes the output signal from the doctor current representation circuit 315 and generates a corresponding digital value that is also supplied to the digital calculation circuit 380.

In operation, the analog-to-digital converters 365 and 370 sample the corresponding output signals and provide digital values corresponding to these samples to the digital calculation circuit 380 which, in turn, utilizes these digital values in determining average values for the parameters Ton and Ttot. These average values for the parameters Ton and Ttot are then used by the digital calculation circuit 380 to calculate the average input current Iin. In the example of FIG. 3(b), the digital calculation circuit 380 includes a memory 382 for storing the digital values received from the analog-to-digital converters 365 and 370 and for storing any other data that must be stored during operation of the digital calculation circuit. The average input current Iin generated by the digital calculation circuit 380 is a digital value and in the embodiment of FIG. 3(b) a digital-to-analog converter 385 converts this digital value of the average input current Iin into a corresponding analog signal. The sampling of the output signals from the comparator 310 and inductor current representation circuit 315 via the analog-to-digital converters 365 and 370 and subsequent processing of the digital values output by these converters in the digital calculation circuit 380 can help reduce the adverse effects of noise and/or transients in the switching regulator 100 that can of course then adversely affect the accuracy of the calculated value of the average input current Iin.

Figure 3C:
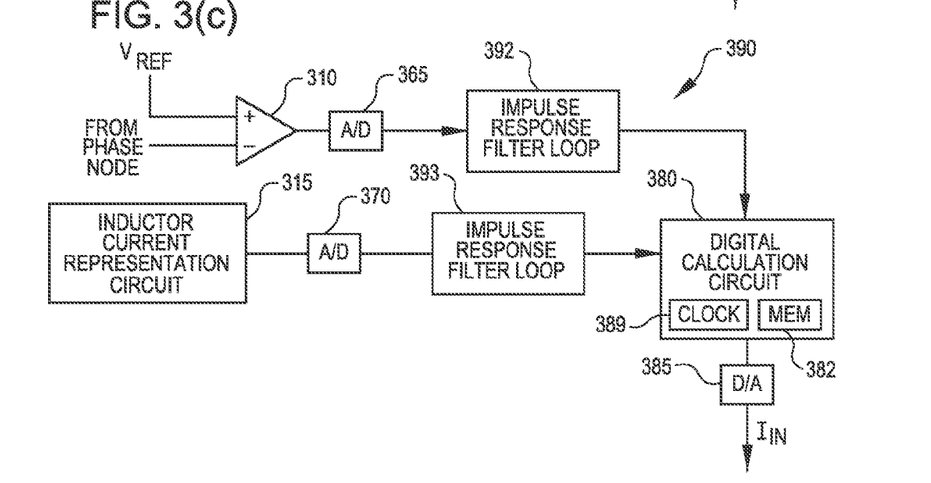
FIG. 3(c) is a block diagram of an input current measurement circuit for measuring input current of the switching regulator of FIG. 1 according to yet another embodiment of the present invention.

FIG. 3(c) illustrates another embodiment of an input current measurement circuit 390 which is similar to the circuit 350 of FIG. 3(b) except that two impulse response filters 392 and 393 filter the digital values output by the analog-to-digital converters 365 and 370, respectively. The impulse response filters 392 and 393 filter the digital values provided by the analog-to-digital converters 265 and 370 such that the filter 392 provides average values for the phase node positive pulse width time Ton and phase node period Ttot and the filter 393 provides an average value for the average inductor current ILavg. The sampling of the output signals from the comparator 310 and inductor current representation circuit 315 via the analog-to-digital converters 365 and 370 and filtering of these digital values via the impulse response filters 392 and 393 reduces the adverse effects that noise and/or transients can have on the calculated values of the Ton and Ttot parameters and thereby on the average input current Iin. The calculation circuit 380 is shown as including a multiphase sampling clock 389 that is operable to automatically calibrate the phase node timing parameters Ton and Ttot being sensed, as will be discussed in more detail below.

In one embodiment of the input current measurement circuit 390, the impulse response filters 392 and 393 are both implemented via a single impulse response filter, such as an infinite impulse response filter. In another embodiment, each of the filters 392 and 393 is a separate infinite impulse response filter, one for generating the average value of time Ton and one for generating the average value of the period Ttot. In anther embodiment, each of the filters 392 and 393 is formed by one or more finite impulse response filters.

Although several components in FIGS. 3(a)-3(c) are assigned the same reference number and are described as having the same operation in each embodiment this does not necessarily mean they are identical. There may be slight differences in the operation and/or structure of these components for implementation in each embodiment, but any such slight differences will be understood by those skilled in the art.

Figure 4:
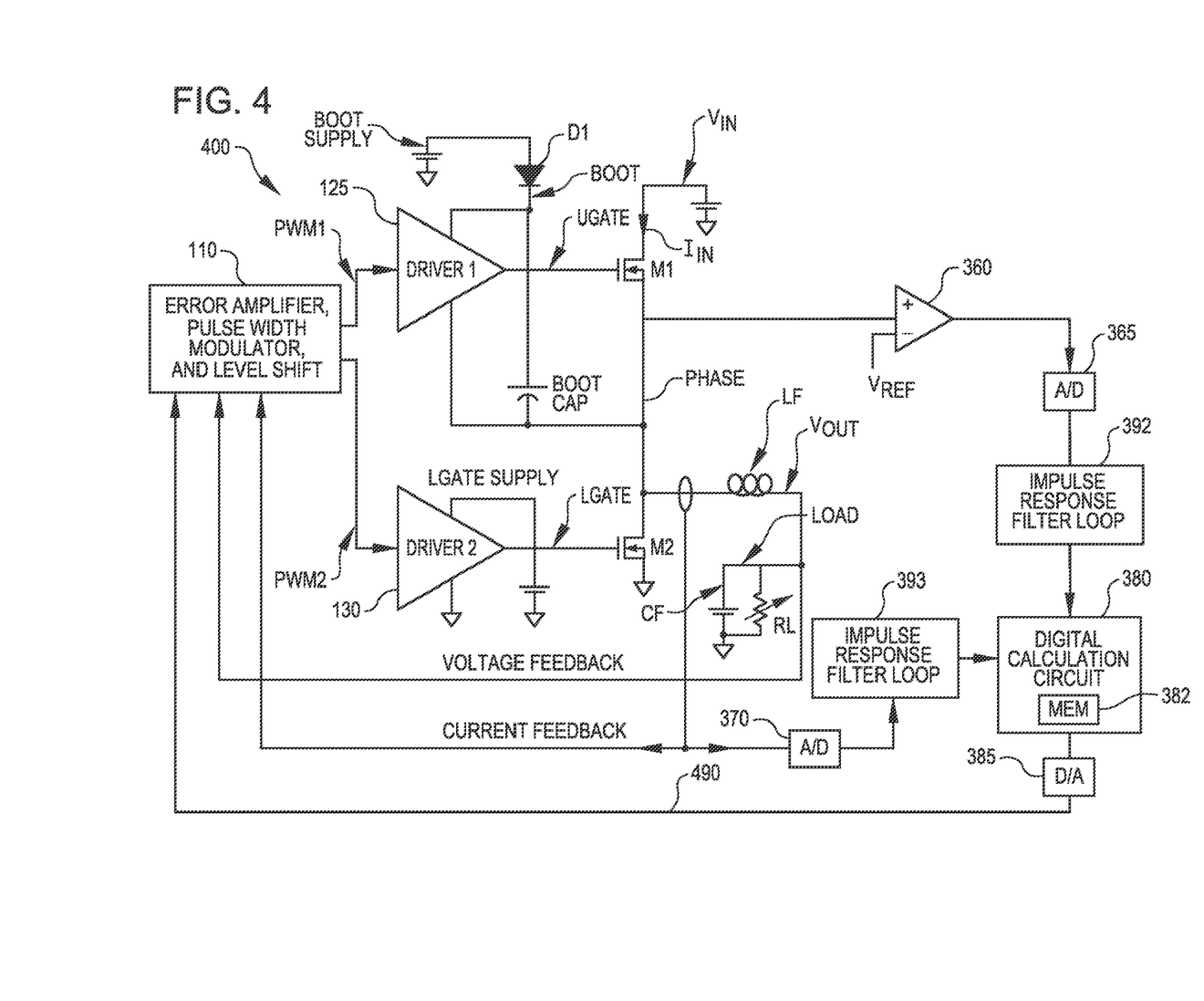
FIG. 4 is a functional block diagram and schematic of a switching regulator including the input current measurement circuit of FIG. 3(c) according to one embodiment of the present invention.

FIG. 4 is a functional block diagram and schematic of a switching regulator 400 including the input current measurement circuit 390 of FIG. 3(c) according to one embodiment of the present invention. Components in the regulator 400 that are the same as the corresponding components in the regulator 100 of FIG. 1 have been given the same reference numbers and will not again be described in detail. The average input current Iin calculated by the digital calculation circuit 380 is fed back to the control section. The load shown as RL represents any of a variety of different loads, such as computer circuitry like a microprocessor and associated circuitry where the regulator 400 is part of a computer power supply, for example.

So called second order effects can result in systematic errors in measuring the average input current Iin in the input current measurement circuits 300, 350, 390. For example, one second order effect is related to the relative time that the upper gate NMOS transistor M1 is active or conducting versus the time it takes to turn this transistor ON and OFF. Another such effect occurs when the regulator is providing a low output current Iout. One approach to eliminating such systematic errors is through in situ measurement of actual performance of the regulator and then factored into the calculations of the average input current Iin in the form of an offset or linear compensation as function of output current Iout of the regulator. Other methods for improving the accuracy of average input current Iin measurements include the use of a multiphase sampling clock, switching time auto calibration, and tailorable detection thresholds, as will be described in more detail below.

For example, in the embodiment of FIG. 4 the calculation circuit 380 can include a multiphase sampling clock to provide a reduction in quantization noise for the measurements being performed. The calculation circuit 380 must, of course, determine the parameters Ton and Ttot with reasonable accuracy to calculate an accurate value for the input current Iin. The higher the sample clock frequency the more often the output signal of the comparator 360 the signal from the sensing of the inductor current IL (via a current sensor in FIG. 4 that corresponds to the inductor current representation circuit 315 of FIG. 3(c)) occur and thus the more accurate the digited values of these signals. The frequency of the sample clock can of course be increase the sample rate of these signals but a higher frequency clock signal can result in the measurement circuit 390 consuming significantly more power. Instead of increasing the frequency of the sample clock, a multiphase sampling clock can be utilized that generates several clock signals at a given lower frequency, with respective clock signals a phase shift with respect to the other clock signals. For example, if the clock signals have a frequency F and N clock signals are developed, then there will be phase shift of (1/F)/N between clock signals.

To achieve a time measurement accuracy of 250 ns, for example, a clock operating at a frequency of at least 4 MHz would generally be needed. If, however, a 1 MHz clock is available in a particular regulator design, the desired 250 ns accuracy can be achieved using multiple 1 MHz clocks each delayed by 250 ns such that a first clock signal has no delay, a second clock signal has a 250 ns delay relative to the first, a third clock signal has a 500 ns relative to the first clock signal, and a fourth clock signal has a 750 ns relative to the first clock signal. Each clock signal could be applied to identical circuitry to control sampling of the desired signals.

In another embodiment, analog sampling circuitry can be utilized to sample the desired signals from the comparator 360 and signal indicating the inductor current IL. For example, inputs to a number of analog comparators can be gated via a MOS switching device to provide a controlled sample period for each comparator, with each switching device receiving a respective multiphase clock signal. The period of the regulator can also be auto-calibrated using multiphase clock signals.

Figure 5:
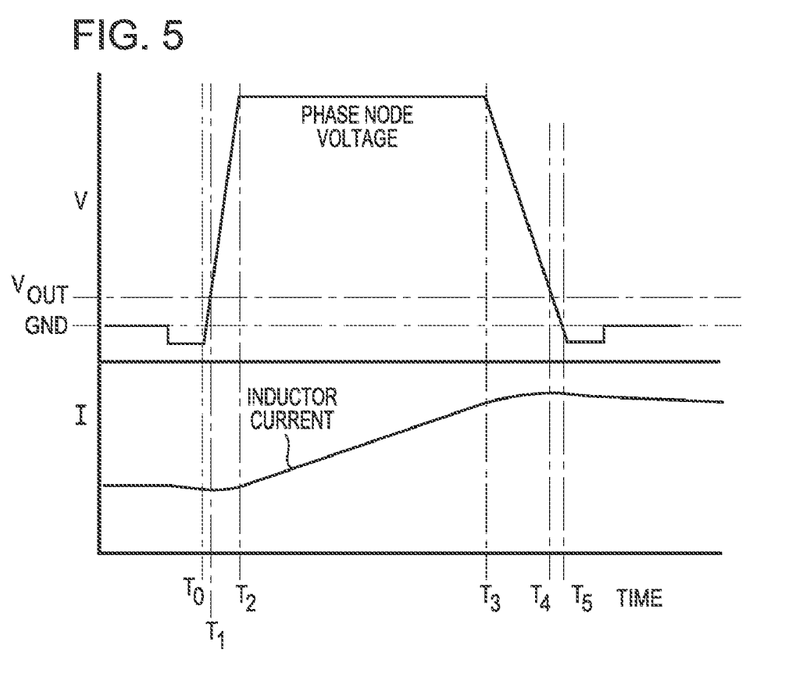
FIG. 5 is a graph showing voltage on the phase node and inductor current as a function of time within a cycle of a switching regulator sourcing current according to an embodiment of the present invention.

FIG. 5 is graph showing voltage on the phase node PH and inductor current IL as a function of time within a cycle of the switching regulator 400 when the regulator is sourcing current and the transistors M1 and M2 are DMOS devices according to an embodiment of the present invention. At a time T0 the upper gate DMOS M1 turns ON, at time T1 voltage on the phase node PH, which will be designated Vphase, equals Vout, at a time T2 the phase node voltage Vphase=Vin, and at a time T3 the upper gate DMOS transistor M1 turns OFF, where the time between T2 and T3 corresponds to Ton. At a time T4, the phase node voltage Vphase=Vout and at a time T5 the body diode of the lower gate DMOS transistor M2 begins conducting and the lower gate DMOS transistor drives the phase node voltage to ground as shown after the time T5. Since the regulator 400 is sourcing or providing current to the load in this example of FIG. 5, the period Ttot of this signal on the phase node PH corresponds to the interval from T0-T5 while Toff is from T3 to T5.

Figure 6:
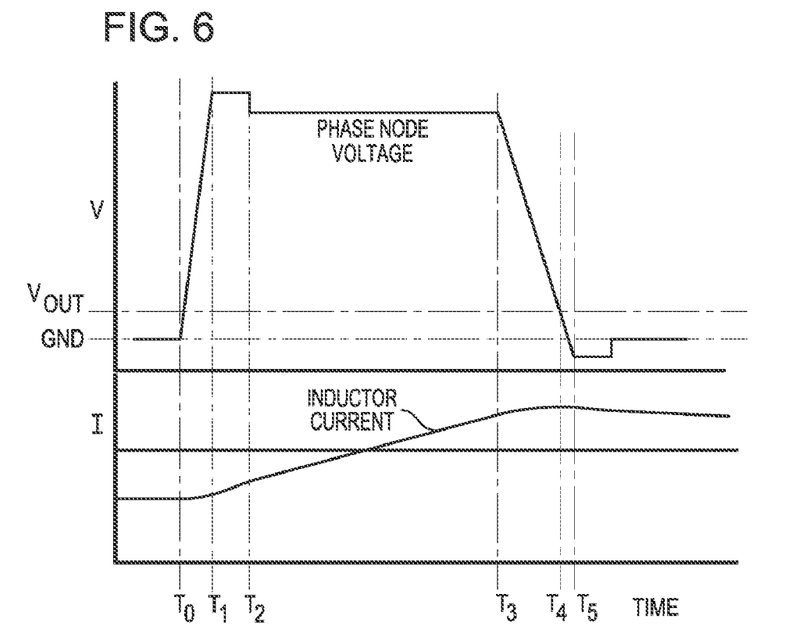
FIG. 6 is a graph showing voltage on the phase node and inductor current as a function of time for a switching regulator and a no load condition according to an embodiment of the invention.

FIG. 6 is a graph showing phase node voltage Vphase and inductor current IL as a function of time for the switching regulator 400 operating in no load condition according to an embodiment of the invention. Once again, the transistors M1 and M2 are DMOS devices. At a time T0 the lower gate DMOS transistor M2 turns OFF, at a time T1 the body diode of the upper switch DMOS transistor M1 begins conducting, and at a time T2 the upper gate DMOS transistor M1 turns ON. At a time T3 the upper gate DMOS transistor M1 turns OFF and at a time T4 the phase node voltage Vphase=Vout. At a time T5 the body diode of the lower gate DMOS transistor M2 begins conducting and this device thereafter turns on to drive the phase node voltage Vphase to ground.

Figure 7:
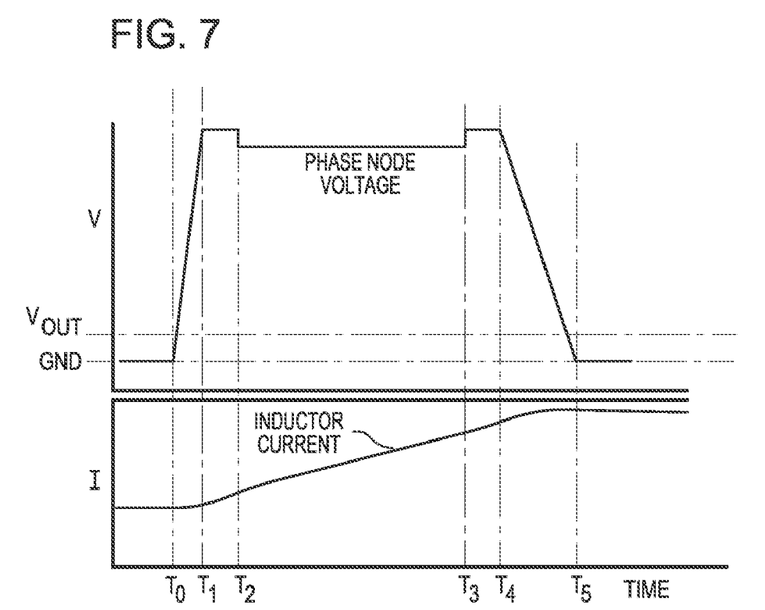
FIG. 7 is a graph showing voltage on the phase node and inductor current as a function of time within a cycle for a switching regulator sinking current according to an embodiment of the present invention.

FIG. 7 is a graph showing phase node voltage Vphase and inductor current IL as a function of time within a cycle of the switching regulator 400 when the regulator is sinking current and where the transistors M1 and M2 are once again DMOS transistors according to an embodiment of the present invention. At a time T0, the lower gate DMOS transistor M2 turns OFF, at time T1 the body diode of the upper gate DMOS transistor M1 begins conducting and at a time T2 the upper gate DMOS transistor M1 turns ON. At a time T3, the upper gate DMOS M1 turns OFF and between time T3 and a time T4 the body diode of the upper DMOS transistor M1 is ON. At a time T4 the lower gate DMOS transistor M2 turns ON and at a time T5 the phase node PH is discharged to ground.

Figure 8:
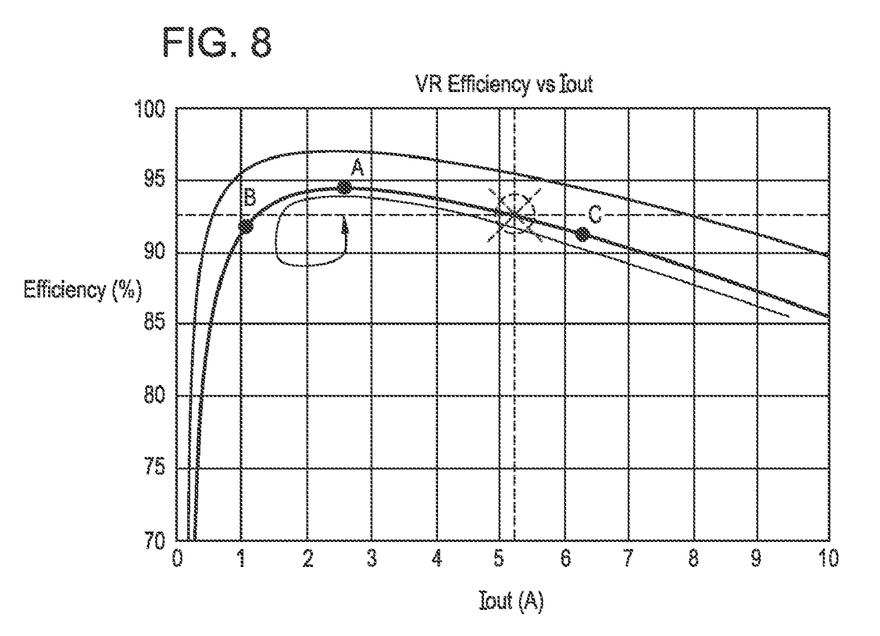
FIG. 8 is a graph showing the efficiency in percent of a switching voltage regulator as a function of output current.

FIG. 8 is a graph showing the efficiency in percent of a switching regulator as a function of output current Iout. A user of a switching regulator may want to know the efficiency of the regulator during operation in order to control the operating parameters of the regulator or the load to thereby optimize or improve the overall efficiency of a system including the regulator. Increasing the efficiency of the switching regulator improves the overall efficiency of the system, reducing power losses and reducing cost of operating the system. A first operating point is designated with an "X" and corresponds to the current operating point of the switching regulator for purposes of the present discussion. If the system containing the switching regulator has real-time access to the efficiency of the switching regulator, such as via a suitable communications bus, then a set point of the switching regulator or the load on the regulator can be changed to improve the efficiency of the regulator and thereby the system.

An example of controlling the load being supplied by the switching regulator is now provided. In the system, the load on a given switching regulator (i.e., power supply containing the switching regulator) can be adjusted at the system level by increasing or decreasing the number of "tasks" the load is performing. For example, assume the load is server computer system or simply a "server" in a server farm or other computer network. Now assume the server is providing two videos to Web users that have accessed a Web site that is hosted by these servers. If the system determines that the switching regulator supplying power to this server is operating in an "inefficient" region of its efficiency curve, a server hub of the system could increase the number of videos being provided by this server from two to four in order to cause the server to present a load that puts the associated switching regulator in a region of higher efficiency. So in this example, the output current Iout may increase from value at X to the value at point C due to the server now providing four videos and consuming more output current Iout to do so. In the example of FIG. 8 note that the efficiency of the switching regulator actually would decrease slightly in this case and it would not be advantageous to change the load in this way. Conversely, if the load is decreased, perhaps by having the server provide only one video, the output current may move to the value corresponding to point A and thereby increasing the efficiency as seen in the graph. These adjustments may be made automatically by the system, with efficiencies of various regulators in the system being occasionally queried and then adjustments made to the loads or operating parameters of selected regulators based upon the current efficiency values. The current efficiency point of each regulator is determined by each regulator itself as described above in this embodiment. Alternatively, the efficiency curve such as that shown in FIG. 8 could be stored in the regulator such that each regulator could make independent adjustments to operating conditions to improve the efficiency of the regulator.

FIG. 8 also illustrates shows how the setpoint of the switching regulator can be adjusted via the three setpoints A, B, and C. If the switching regulator is operating at point C for a given load, and the system moves the setpoint to point B from point C, the system or regulator can determine via the efficiency curve that a point A on the efficiency curve exists that is more efficient than either point B or point C and the system can then make adjustments, such as by changing loads a just discussed above, to thereby move the operating point of the regulator to point A.

Figure 9:
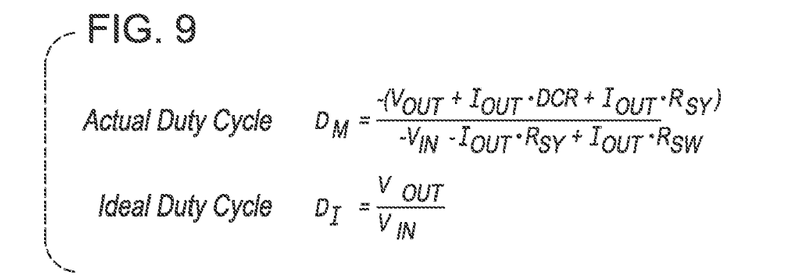
FIG. 9 shows equations according to an embodiment of the present invention for an actual duty cycle and an ideal duty cycle when the voltage regulator is sourcing current.

FIG. 9 shows equations for an actual duty cycle and an ideal duty cycle when the voltage regulator is sourcing current. These equations can be used to calculate an actual duty cycle DM and an ideal duty cycle DI when the switching regulator is sourcing current. The equation for the actual duty cycle DM includes non-ideal parameters such as the various parasitic resistances, where DCR is the DC resistance of the inductor LF, Rsw is the series resistance of the transistor M2 and Rsy is the series resistance of the transistor M1.

Figure 10:
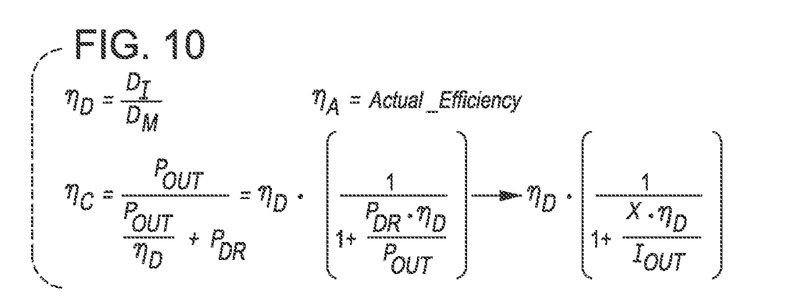
FIG. 10 shows a method for compensating the measured duty cycle data to generate efficiency data using a programmable gain according to an embodiment of the present invention.

FIG. 10 shows a method for compensating the measured duty cycle data to generate efficiency data using a programmable gain according to an embodiment of the present invention. In many Buck converters and other types of switching regulators ideal Vout is known, such as when an internal reference voltage applied to an input of an error amplifier in the control section 110 is equal to the output voltage Vout. If the input voltage Vin is tightly regulated then the ideal duty cycle DI can be determined without external measurements of Vout and Vin. If this is true, then the efficiency of the switching regulator can be determined using merely the measured duty cycle DM and output current Iout. On-chip signal processing techniques can he used to extract efficiency from the measured duty cycle DM using the ideal duty cycle DI and a programmable gain, such as by using a programmable variable X as shown in the equation of FIG. 10. The variable X can be determined by estimating the gate drive and controller losses of the Buck regulator via simulation and by examining the datasheet parameters of components in the Buck regulator, such as the switching transistors, drivers, control section components, and so on.

The specific architecture of systems that calculate efficiency via embodiments of the present invention may of course vary. For example, in a system including a number of regulators a central location may be used for making such calculations based upon signals provided by the respective input current measurement circuits on the individual switching regulators. Small delays between the sensing of the various values for Ton, Ttot, and IL can, however, result in differences in the average values which can become a source of error in calculating the average input current Iin. In general, improved accuracy results when the parameter values are sensed and used in determining Iin within a given switching regulator and even within a given integrated circuit containing most of the regulator circuitry where this is the case. Information on the respective calculated efficiency values can then be reported to a central location for use in overall system control or can be to the central location in response to a query command from the central location.

Moreover, although generally described relative to single phase regulators, the embodiments of the invention are applicable to multiphase switching regulators as well. In a multiphase regulator, input current measurement circuits could be replicated across each phase or a single circuit could be used in overall control of the multiphase regulator. For example, in some multiphase systems the duty cycle and current can be measured in one phase and since multiphase systems are generally balanced the full regulator efficiency or overall Iin can be estimated from the measurement of the parameters Ton, Ttot, and Iin for a single one of the phases. Alternatively, the output current and duty cycle of each phase can be measured individually and the duty cycle data from each phase can be averaged and the output current Iout from each phase can be summed together to calculate overall input current Iin and overall efficiency of the regulator.

Figure 11:
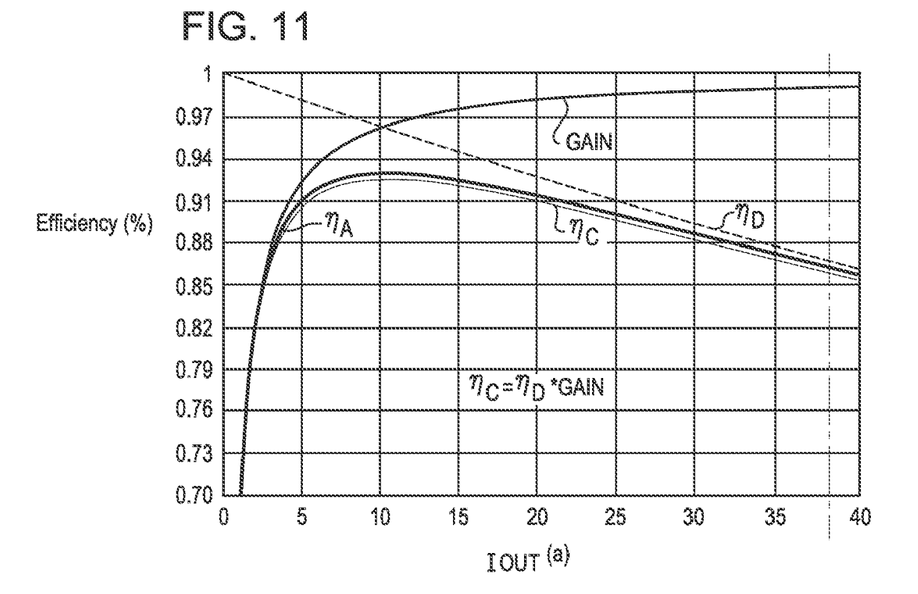
FIG. 11 is a graph showing simulated and calculated voltage regulator efficiency data as a function of output current according to an embodiment of the present invention.

FIG. 11 is a graph showing simulated and calculated voltage regulator efficiency data as a function of output current according to an embodiment of the present invention. The curve ηA is the simulated real efficiency of a single phase buck regulator while ηD is the simulated results for an ideal duty cycle divided by the measured duty cycle. The curve labeled Gain is the curve used to modify ηD using the programmable coefficient X described in FIG. 10. The curve ηC shows that the measured data ηD will match the real efficiency curve ηA when multiplied by the gain term (using X), which shows how raw measurements with a compensation calculation according to an embodiment of the present invention can accurately determine the efficiency of the system.

Figure 12:
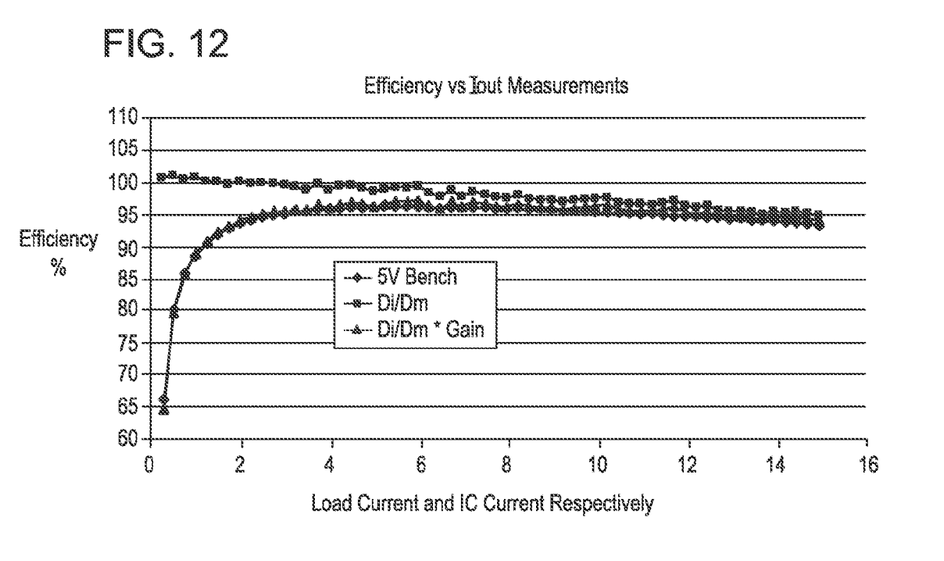
FIG. 12 is a graph showing actual efficiency data measured in the lab using a single phase Buck voltage regulator compared with an efficiency curve generated using the duty cycle measurement technique according to embodiments of the present invention.

FIG. 12 is a graph showing actual efficiency data measured in the lab using a single phase Buck voltage regulator compared with an efficiency curve generated using the duty cycle measurement technique according to embodiments of the present invention. The curve labeled Di/Dm is the raw measurement made by the input current measurement circuitry, the curve labeled (Di/Dm)*Gain is the result of the raw measurement multiplied by a first order compensation (using X). The curve labeled 5V Bench is the actual efficiency of the Buck regulator measured by observing Vin, Iin, Vout, and Iout and calculating Pout/Pin by Vout×Iout/Vin×Iin. FIG. 12 demonstrates that accurate efficiency measurements can be provided using the duty cycle measurement and applying compensation according to embodiments of the present invention since the (Di/Dm)*Gain curve tracks the 5V Bench curve closely as illustrated in the figure.

Figure 13:
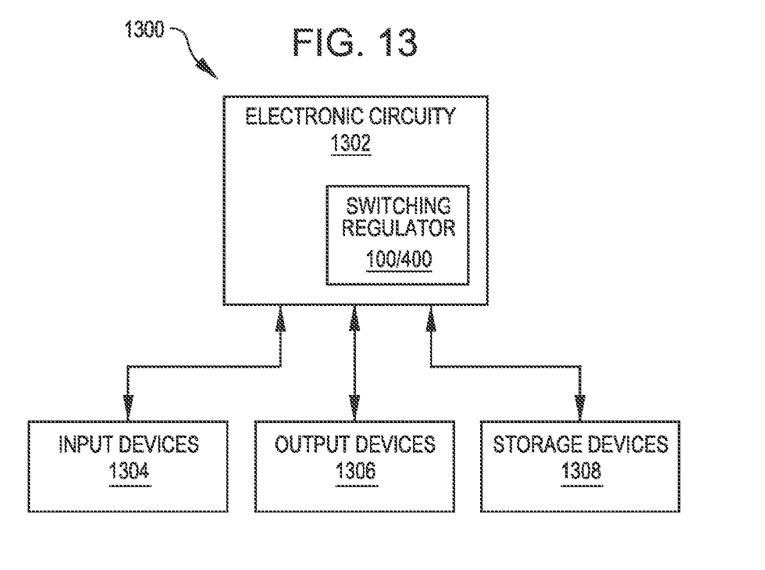
FIG. 13 is a block diagram of an electronic system including electronic circuitry including the switching regulator of FIG. 1 and/or FIG. 4 according to one embodiment of the present invention.

Switching regulators according to embodiments of the present invention can be embodied as a variety of different types of electronic devices and systems, such as computer, cellular telephone, personal digital assistant, and industrial systems and devices. More specifically, some applications include but are not limited to CPU power regulators, chip set regulators, point of load power regulators, and memory power regulators. FIG. 13 is a block diagram of an electronic system 1300 including electronic circuitry 1302 including the switching regulator 100 and/or 400 of FIGS. 1 and 4. The electronic circuitry 1302 includes circuitry for performing various functions required for the given system, such as executing specific software to perform specific calculations or tasks where the electronic system is a computer system. In addition, the electronic system 900 may include one or more input devices 904, such as a keyboard or a mouse or touchpad, coupled to the electronic circuitry 902 to allow an operator to interface with the system. Typically, the electronic system 900 also includes one or more output devices 906 coupled to the electronic circuitry 902, such output devices typically including a video display such as an LCD display. One or more data storage devices 908 are also typically coupled to the electronic circuitry 902 to store data or retrieve data from storage media (not shown). Examples of typical storage devices 908 include magnetic disk drives, tape cassettes, compact disk read-only (CD-ROMs) and compact disk read-write (CD-RW) memories, and digital video disks (DVDs), FLASH memory drives, and so on.

Even though various embodiments and advantages of the present invention have been set forth in the foregoing description, the above disclosure is illustrative only, and changes may be made in detail and yet remain within the broad principles of the present invention. Moreover, the functions performed by components in the described embodiments of switching regulators may in some cases be combined to be performed by fewer elements, separated and performed by more elements, or combined into different functional, as will be appreciated by those skilled in the art. Moreover, embodiments including fewer than all the components of any of the respective described embodiments may also be within the scope of the present invention although not expressly described in detail. Finally, the operation of well known components and/or processes has not been shown or described in detail below to avoid unnecessarily obscuring the present invention. Therefore, the present invention is to be limited only by the appended claims.

What is claimed is:

1. A synchronous regulator, comprising:
a controller coupled to receive a reference signal and a feedback signal from said regulator operable to provide a pulse width modulation (PWM) signal at its output, at least one gate driver coupled to receive said PWM signal, and a synchronous output switch having a phase node controlled by said gate driver, and
input current measurement circuitry, comprising:
a circuit operable for providing a signal representative of at least one phase node timing parameter;
a sensing circuit operable for sensing inductor or output current provided by said regulator, and
a calculation circuit coupled to receive said signal representative of each phase node timing parameter and said inductor or output current and being operable to determine an input current to said regulator from each phase node timing parameter and the inductor or output current.

2. The regulator of claim 1, wherein said phase node timing parameter comprises a pulse width and a pulse period at said phase node, further wherein said pulse width and said pulse period both comprise averages calculated over a plurality of pulse periods.

3. The regulator of claim 1, wherein said circuit operable for providing a signal representative of phase node timing parameter comprises a comparator having a first input coupled to said phase node and a second input biased at a reference voltage level.

4. The regulator of claim 1, further comprising digital circuitry coupled to receive said signal representative of phase node timing parameter and said inductor or said output current and provide average values for said phase node timing parameter and said inductor or said output current.

5. A synchronous regulator, comprising:
a controller coupled to receive a reference signal and a feedback signal from said regulator operable to provide a pulse width modulation (PWM) signal at its output, at least one gate driver coupled to receive said PWM signal, and a synchronous output switch having a phase node controlled by said gate driver, and
input current measurement circuitry, comprising:
a circuit operable for providing a signal representative of at least one phase node timing parameter;
a sensing circuit operable for sensing inductor or output current provided by said regulator, and
a calculation circuit coupled to receive said signal representative of each phase node timing parameter and said inductor or output current and being operable to determine an input current to said regulator;
digital circuitry coupled to receive said signal representative of phase node timing parameter and said inductor or said output current and provide average values for said phase node timing parameter and said inductor or said output current; and
wherein said phase node timing parameter comprises:
a pulse width and a pulse period at said phase node;
said digital circuitry comprises a first IIR filter for determining said pulse width, a second W filter for determining said pulse period, and
a third W filter for determining said average inductor or output current.

6. The regulator of claim 1, wherein said calculation circuit comprises a multiphase sampling clock, wherein said multiphase sampling clock is operable to automatically calibrate said phase node timing parameter.

7. The regulator of claim 1, wherein said input current provided by said digital calculation circuit is coupled to an input of said modulation controller.

8. The regulator of claim 7, wherein said digital calculation circuit includes memory for storing an efficiency curve for said regulator versus a current supplied to said load.

9. A regulator input current measurement circuit, comprising:
a circuit operable for providing a signal representative of at least one timing parameter at a phase node of a switching regulator;
a sensing circuit operable for sensing inductor or output current provided by the regulator, and
a calculation circuit coupled to receive the signal representative of the phase node timing parameters and the inductor or output current operable to utilize the signal representative of the phase node timing parameters and the inductor or output current to determine an input current to the regulator.

10. The measurement circuit of claim 9, wherein said circuit operable for providing a signal representative of phase node timing parameter comprises a comparator having a first input coupled to said phase node and a second input biased at a reference voltage level.

11. The measurement circuit of claim 9, further comprising digital circuitry coupled to receive said signal representative of phase node timing parameter and said inductor or said output current and provide average values for said phase node timing parameter and said inductor or said output current.

12. The measurement circuit of claim 11, wherein said phase node timing parameter comprises a pulse width and a pulse period at said phase node and said digital circuitry comprises a first IIR filter for determining said pulse width, a second IIR filter for determining said phase period, and a third IIR filter for determining said average inductor or output current.

13. The measurement circuit of claim 9, wherein said digital calculation circuit includes memory for storing an efficiency curve for said regulator as a function of output current to a load driven by said regulator.

14. A system, comprising:
a synchronous regulator, comprising:
  a controller coupled to receive a reference signal and a feedback signal from said regulator operable to provide a pulse width modulation (PWM) signal at its output,
  at least one gate driver coupled to receive said PWM signal, and a synchronous output switch having a phase node controlled by said gate driver; and
a regulator input current measurement circuit, comprising:
  a circuit operable for providing a signal representative of at least one phase node timing parameter;
  a sensing circuit operable for sensing inductor or output current provided by said regulator, and
  a calculation circuit coupled to receive said signal representative of said phase node timing parameters and said inductor or output current and operable from the signal and current to determine an input current to said regulator;
wherein an output of said regulator provides regulated power to at least one load.

15. The system of claim 14, wherein said load comprises a CPU or a chip set.

16. A method for determining input current to a switching regulator, comprising:
  measuring or estimating parameters comprising a pulse width at a phase node of the regulator, a pulse period at the phase node of the regulator, and an inductor current or output current provided by the regulator, and
  determining an input current to the switching regulator based on these parameters.

17. The method of claim 16, wherein said parameters comprise averages obtained over a plurality of pulse periods.

18. The method of claim 16, wherein said pulse width and said pulse period are determined using a comparator, said comparator determining if said phase node is above or below a threshold level.

19. The method of claim 16, further comprising averaging said pulse width, said pulse period and said inductor current or said output current using digital filtering, and using average values for said pulse width, said pulse period and said inductor current or said output current in said determining step.

20. The method of claim 19, wherein said digital filtering comprises using separate digital filters for providing an average value of said pulse width, an average value of said pulse period, and an average value of said inductor current or said output current.

21. The method of claim 16, wherein said determining step comprises multiplying said pulse width by said inductor current or said output current and dividing a result of said multiplying by said pulse period.

22. The method of claim 16, further comprising the step of using said to calculate a power efficiency provided by said regulator.

23. The method of claim 16, further comprising the step determining an actual duty cycle of said regulator and using said actual duty cycle together with a compensated ideal duty cycle for said regulator to calculate a power efficiency provided by said regulator.

24. The method of claim 23, further comprising the step of compensating said ideal duty cycle with a first variable associated with heavy load current operation and a second variable associated with a light load current condition to provide compensated ideal duty cycle.

25. The method of claim 24, wherein said first and second variables are programmable variables stored on an on-chip portion of said regulator.

* * * * *